(12) United States Patent
Ben-David et al.

(10) Patent No.: US 11,232,714 B2
(45) Date of Patent: *Jan. 25, 2022

(54) DEVICE AND SYSTEM FOR DOCKING AN AERIAL VEHICLE

(71) Applicant: INDOOR ROBOTICS LTD., Ramat-Gan (IL)

(72) Inventors: Doron Ben-David, Ramat-Gan (IL); Amit Moran, Tel-Aviv (IL)

(73) Assignee: INDOOR ROBOTICS LTD., Ramat Gan (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/229,913

(22) Filed: Apr. 14, 2021

(65) Prior Publication Data

US 2021/0233418 A1 Jul. 29, 2021

Related U.S. Application Data

(63) Continuation of application No. 17/089,755, filed on Nov. 5, 2020, now Pat. No. 11,011,066, which is a (Continued)

(30) Foreign Application Priority Data

Sep. 20, 2018 (IL) .......................................... 261912

(51) Int. Cl.
*G05D 1/00* (2006.01)
*G05D 1/10* (2006.01)
(Continued)

(52) U.S. Cl.
CPC ........... *G08G 5/025* (2013.01); *B64C 39/024* (2013.01); *G05D 1/106* (2019.05); *G08G 5/0069* (2013.01); *B64C 2201/18* (2013.01)

(58) Field of Classification Search
CPC .... G08G 5/025; G08G 5/0069; B64C 39/024; B64C 2201/18; B64C 2201/182; B64C 2201/042; G05D 1/106
See application file for complete search history.

(56) References Cited

U.S. PATENT DOCUMENTS 10,407,182 B1 * 9/2019 Alcorn .................... B64F 1/125
10,462,366 B1 * 10/2019 Bart ....................... B64C 39/024
(Continued)

FOREIGN PATENT DOCUMENTS

JP 2016165215 A 9/2016
JP 2019206259 A 12/2019
(Continued)

*Primary Examiner* — Yonel Beaulieu
(74) *Attorney, Agent, or Firm* — Alphapatent Associates, Ltd; Daniel J. Swirsky

(57) ABSTRACT

A system for securing an aerial vehicle to a lower portion of a docking station, including a docking station having a top section located in an upper portion of the docking station, the top section having an interface configured to hang the docking station above the ground and a bottom section located in a lower portion of the docking station, the docking station having a latching mechanism located on the bottom section, configured to secure the aerial vehicle to the docking station, the system also including the aerial vehicle having a docking member configured to dock the aerial vehicle into the docking station and to release the aerial from the latching mechanism of the docking station, and a processing module configured to control the operation of the docking member.

13 Claims, 10 Drawing Sheets

Related U.S. Application Data continuation of application No. PCT/IL2019/051033, filed on Sep. 16, 2019.

(51) Int. Cl.
| | | |
|---|---|---|
| *B64C 39/00* | (2006.01) | |
| *B64C 39/02* | (2006.01) | |
| *G08G 5/00* | (2006.01) | |
| *G08G 5/02* | (2006.01) | |

(56) References Cited

U.S. PATENT DOCUMENTS

| | | | |
|---|---|---|---|
| 2014/0232331 A1* | 8/2014 | Stamenic | H02J 50/12 |
| | | | 320/108 |
| 2018/0029723 A1* | 2/2018 | Krauss | B64F 1/18 |
| 2018/0056794 A1* | 3/2018 | Kim | B60L 11/182 |
| 2019/0229462 A1* | 7/2019 | Hodgson | H01F 7/20 |
| 2019/0344679 A1* | 11/2019 | Miller | B60L 8/003 |
| 2020/0052512 A1* | 2/2020 | Farrahi Moghaddam | |
| | | | H02J 7/0018 |
| 2020/0290752 A1* | 9/2020 | Kolosiuk | B60L 53/14 |
| 2021/0056856 A1* | 2/2021 | Ben-David | G05D 1/106 |

FOREIGN PATENT DOCUMENTS

| | | |
|---|---|---|
| JP | 2018199403 A | 6/2021 |
| KR | 101668639 B1 | 10/2016 |
| KR | 20170104186 A | 9/2017 |

* cited by examiner

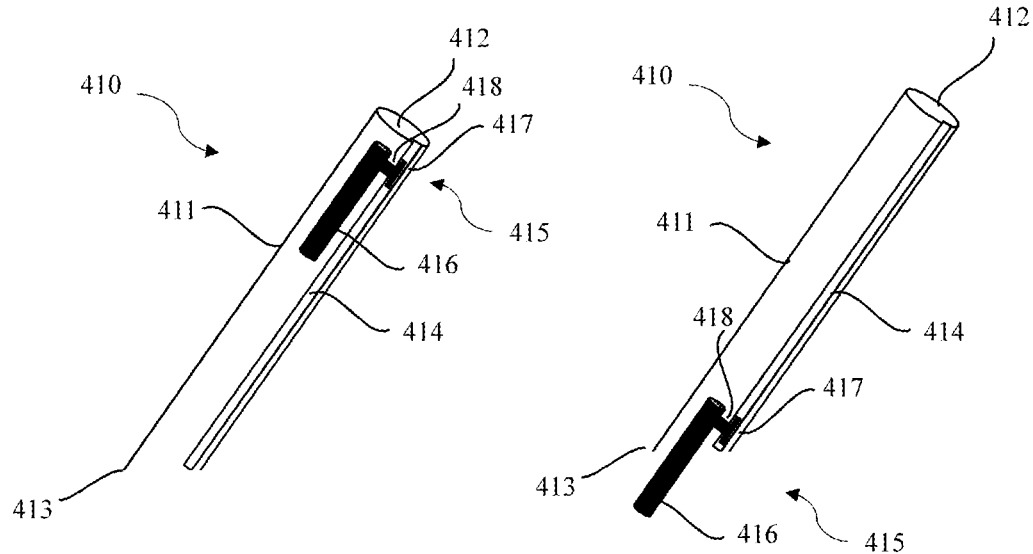
Figure 4A
Figure 4B
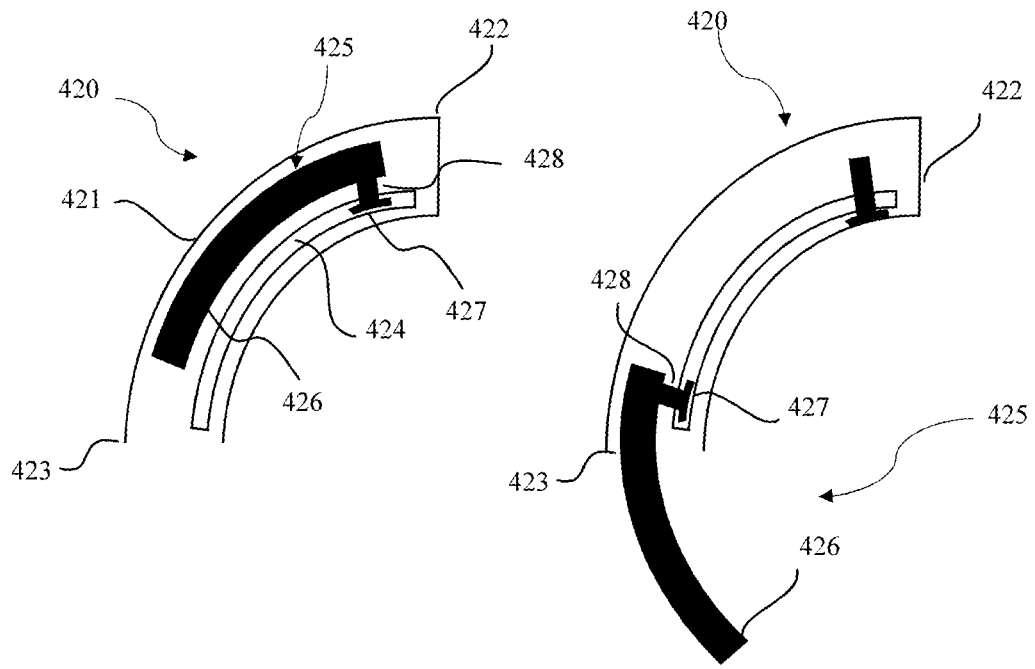
Figure 4C
Figure 4D

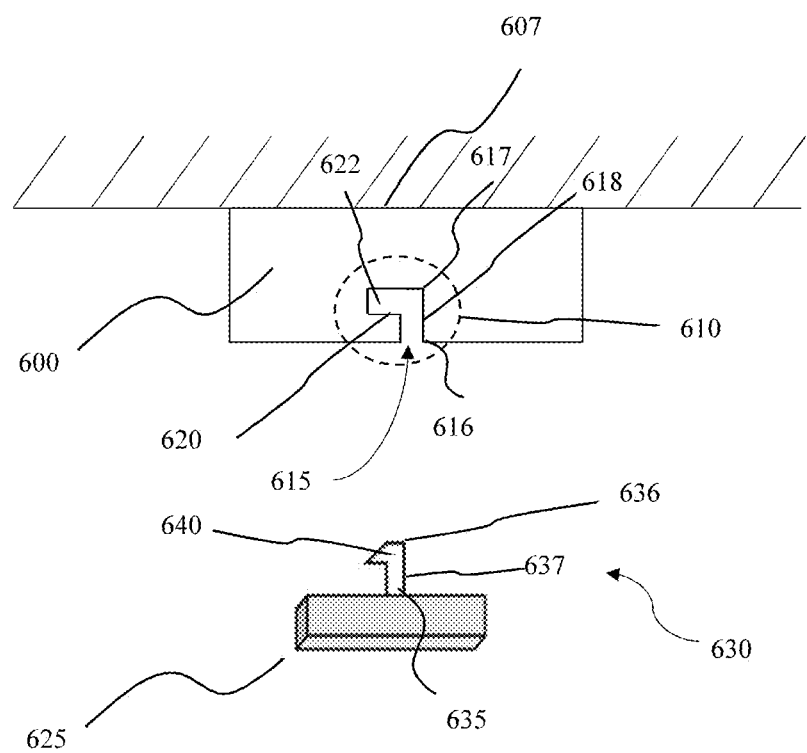
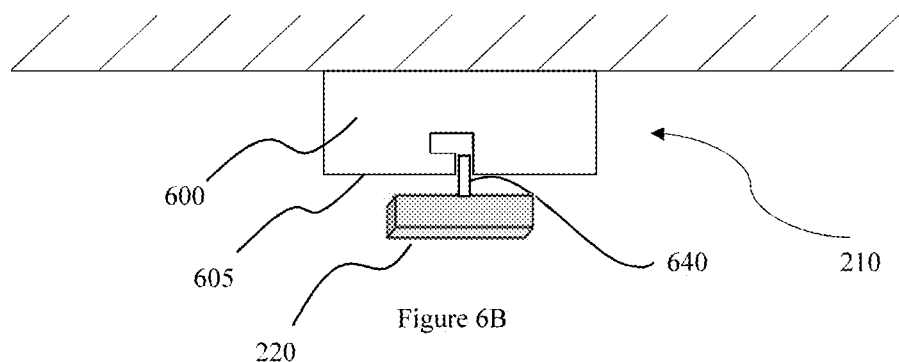

DEVICE AND SYSTEM FOR DOCKING AN AERIAL VEHICLE

CROSS-REFERENCE TO RELATED APPLICATIONS

This application is a continuation of U.S. patent application Ser. No. 17/089,755, filed Nov. 5, 2020, and issued as U.S. Pat. No. 11,011,066 on May 18, 2021, which is a continuation of International Application No. PCT/IL2019/051033, filed Sep. 16, 2019, which claims priority and benefit from Israel Patent Application No. 261912, filed Sep. 20, 2018, and issued as Israel Patent No. 261912 on Jan. 4, 2020.

FIELD OF THE INVENTION

The present invention relates to unmanned and drone aircraft and more specifically to a docking station for aerial vehicles.

BACKGROUND OF THE INVENTION

More and more fields are utilizing Unmanned Aerial Vehicles (UAVs), such as multirotor copters and similar vertical aircraft, which are able to vertically take-off and land. These aerial vehicles are used in many fields and are about to be used in even more as time goes on. In order to fly around without being connected to a power source, the aerial vehicle utilizes an internal power source which in most cases is rechargeable. The charging of the rechargeable power source is typically done by either connecting the aerial vehicle to a suitable docking station or directly to a power source (such as the domestic electrical grid). The aerial vehicles may employ location and position mechanisms such as GPS, vision sensors, distance sensors and the like.

In order to charge the aerial vehicle in a docking station, the aerial vehicle is required to navigate to the docking station, dock itself to the docking station, and to maintain a docking position on the docking station. However, the docking (i.e. navigation in close distances) and maintaining the docking position (of the aerial vehicle on the docking station), usually requires computational and hardware resources. Since aerial vehicles are influenced a lot by weight, such hardware resources and computational resources may be relieved from the aerial vehicle, causing the aerial vehicle to function better.

Therefore, there is a great need for a device that would help aerial vehicles to dock and maintain the position thereof after docking thereon.

SUMMARY OF THE INVENTION

It is an object of the subject matter to disclose a system for securing an aerial vehicle to a lower portion of a docking station, comprising a docking station, comprising a top section located in an upper portion of the docking station, said top section comprises an interface configured to hang the docking station above the ground, a bottom section located in a lower portion of the docking station, said docking station comprises a latching mechanism located on said bottom section, configured to secure said aerial vehicle to said docking station. The system also comprises the aerial vehicle, comprising a docking member, said docking member is configured to dock the aerial vehicle into the docking station and to release the aerial from the latching mechanism of the docking station, and a processing module configured to control the operation of the docking member.

In some cases, the latching mechanism of the docking station is a magnetic latching mechanism comprising at least one magnetic component and wherein the docking member is a ferromagnetic member, such that the docking member is attracted to the magnetic latching mechanism.

In some cases, the processing module is configured to move the docking member between a first position in which the docking member is attracted to the magnetic latching mechanism to a second position in which the docking member is not attracted to the magnetic latching mechanism, when removing the aerial vehicle from the docking station.

In some cases, the aerial vehicle comprises a magnetic member controlled by the processing module, said magnetic member is configured to reject the magnetic field applied by the magnetic latching mechanism.

In some cases, the magnetic latching mechanism comprises a metal plate located on the lower portion of the docking station. In some cases, the magnetic latching mechanism is located in the docking station connecting element. In some cases, the magnetic latching mechanism comprises at least one electromagnetic component.

In some cases, the docking member comprises at least one magnetic component and wherein the latching mechanism of the docking station comprises ferromagnetic member, such that the magnetic latching mechanism is attracted to the docking member.

In some cases, the processing module is configured to activate the magnetic field created by the magnetic component of the docking member.

In some cases, the docking station connecting element comprises at least two conductive elements; wherein a first conductive element of the at least two conductive elements is configured to enable electrical current and a second conductive element of the at least two conductive elements is configured to exchange electrical signals with the aerial vehicle.

In some cases, the aerial vehicle further comprises an image capturing device configured to capture images in the surrounding of the docking station.

In some cases, the docking station also comprises a docking station connecting element extending from a lower surface of the docking station, said docking station connecting element is configured to charge the aerial vehicle; and wherein the aerial vehicle comprises an aerial vehicle connector located on a top section of the aerial vehicle configured to receive electrical power from the docking station.

In some cases, the docking member is configured to maneuver the latching mechanism from a first position, in which the latching mechanism secures the aerial vehicle to the docking station to a second position in which the aerial vehicle is released from the docking station.

BRIEF DESCRIPTION OF THE DRAWINGS

The invention may be more clearly understood upon reading of the following detailed description of non-limiting exemplary embodiments thereof, with reference to the following drawing figures, in which:

FIGS. 4A-4D discloses hollow tubes with locking units disposed therein, according to exemplary embodiments of the subject matter.

FIGS. 6A-6D disclose a docking station positioned comprising a magnetic latching system, according to exemplary embodiments of the subject matter;

Figure 1:
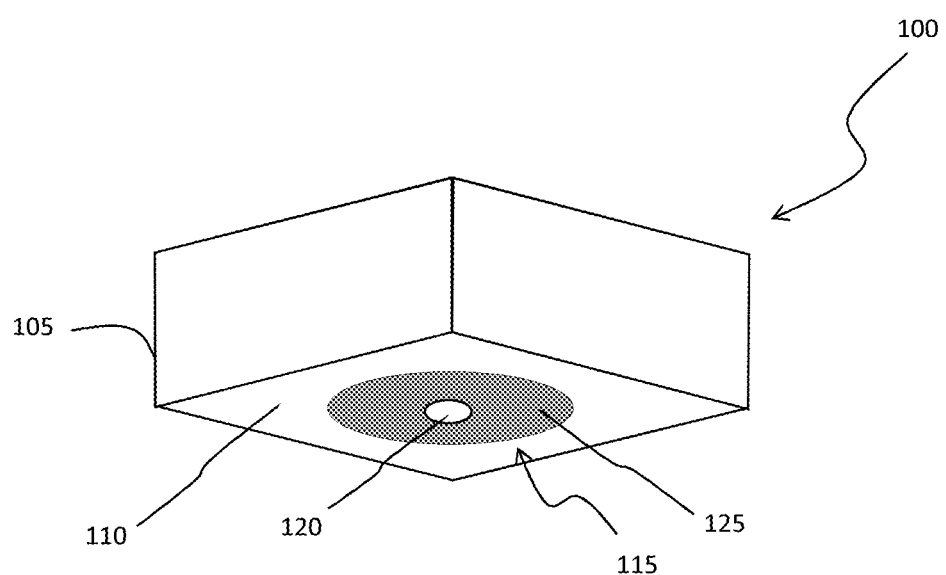
FIG. 1 disclose a docking station for landing an aerial vehicle thereon, according to exemplary embodiments of the subject matter.

The following detailed description of embodiments of the invention refers to the accompanying drawing figures referred to above. Dimensions of components and features shown in the drawing figures are chosen for convenience or clarity of presentation and are not necessarily shown to scale. Wherever possible, the same reference numbers will be used throughout the drawing figures and the following description to refer to the same and like parts.

DETAILED DESCRIPTION

Illustrative embodiments of the invention are described below. In the interest of clarity, not all features/components of an actual implementation are necessarily described.

The subject matter in the present invention discloses an aerial vehicle and a docking station configured to dock the aerial vehicle thereon. The term "aerial vehicle" used herein depicts unmanned aerial vehicles such as drones, multicopters and other unmanned aerial vehicle configured to take-off and land vertically. The term "hover" used herein is defined as maintaining a substantially fixed latitude from a specified surface of a docking station. The term "optimal connection" used herein is defined as the situation where a connection element of the aerial vehicle and the connection element of the docking station are connected to each other in such position that signals/power are transferred effectively and without connection interferences.

The term "dock" or "docking" used herein is defined as securing an aerial vehicle to the docking station, in a manner that the aerial vehicle cannot fall or lose contact with the docking system. The term "guide" or "guiding" used herein is defined as bringing the aerial vehicle to an optimal connection with the docking station. Additionally, "upwards" means toward the ceiling, and "downwards" means toward the floor.

The subject matter discloses a system having a docking station and an aerial vehicle configured to be secured to the docking station. The docking station is located above the ground or a room's floor, for example secured to a ceiling or a shelf. The aerial vehicle is secured to the docking station from below, at the lower section of the docking station, closer to the ground. The aerial vehicle may be secured to a niche in the docking station, such that the bottom surface of the docking station is closer to the ground than the bottom surface of the aerial vehicle. The aerial vehicle may be secured to the docking station using a magnetic connection. The magnetic connection is defined by one of the parties, the aerial device and the docking station, has a magnetic element and the other party has an item attracted to the magnetic element, such as a ferromagnetic element. The magnetic connection is controlled by the aerial vehicle or by the docking station. In some cases, the docking station lacks a power source and/or processing capabilities, and release of the aerial vehicle from the docking station is initiated and controlled by the aerial vehicle. At least one of the aerial vehicle or the docking station comprise a magnetic member configured to attract a ferromagnetic member located in the other entity. When releasing the aerial vehicle from the docking station, a processing module of the aerial vehicle may activate, deactivate or maneuver a module in the aerial vehicle to reduce or cancel the magnetic connection between the aerial vehicle and the docking station. In some other cases, the docking station comprises a processing module configured to control the release of the aerial vehicle. Release of the aerial vehicle may be initiated according to a predefined rule, for example once every hour, or in response to a predefined event, such as identifying a person in the room in which the docking station is installed.

FIG. 1 discloses a docking station for landing an aerial vehicle thereon, according to exemplary embodiments of the subject matter. FIG. 1 discloses a docking station 100 comprising: a top section 105 having a connection surface 110. In some embodiments, the top section 105 may be deployed on a ceiling, where the connection surface 110 thereof would be facing downwards. The term downwards also comprises a slope of up to 30 degrees from the ground. In some other cases, the term downwards is defined as a slope of up to 5 degrees from the ground. In other embodiments, the top section 105 is secured to a wall, and the connection surface 110 is facing downwards. The top section 105 may be secured to a wall using a pole substantially parallel to the ground. The top section 105 may comprise a latching mechanism 115 located on the connection surface 110. In some embodiments, the latching mechanism 115 is located at the center of the connection surface 110. Additionally, the docking station 100 comprises a docking station connecting element 120. The docking station connecting element 120 comprises a power connection, for charging a power source of the aerial vehicle. In some embodiments, the docking station connecting element 120 further comprises a data connection for exchanging data with the aerial vehicle.

The latching mechanism 115 is configured to secure the aerial vehicle to the docking station 100. In some embodiments, the latching mechanism 115 may be designed to secure the aerial vehicle mechanically, magnetically or electrically. In some embodiments, the latching mechanism 115 is passive, and is configured to receive an aerial vehicle connection element. In other embodiments, the latching mechanism 115 is configured to actively guide the aerial vehicle. In such cases, wireless transmission between the docking station connecting element 120 and the aerial vehicle connecting elements causes the latching mechanism 115 to be activated and to guide the aerial vehicle connecting element to a desired location.

In the embodiment shown in FIG. 1, the latching mechanism 115 comprises a magnetic ring 125 and the aerial vehicle connecting element comprises a docking member configured to dock the aerial vehicle into the docking station and to release the aerial from. The docking and release may be implemented mechanically, for example by the docking member applying power from the aerial vehicle motor to push the latching mechanism of the docking station. In some other cases, the docking and release is implemented by a screw mechanism located at the top section of the aerial vehicle, the screw mechanism may be screwed at a bore in the docking station. The docking and release may be implemented by creating a magnetic connection between the docking member of the aerial vehicle and the docking station. The magnetic connection secures the aerial vehicle under the docking station, without the aerial vehicle falling downwards, thus reducing or canceling the power needed to carry the aerial vehicle above the ground. In some cases, the docking member of the aerial vehicle connection element is shaped to fit the magnetic ring 125 of the latching mechanism 115. The docking member may be rigid, semi rigid or elastic, for example an elastic tube embedded with magnetic objects. The docking member is made in a manner attracted to the magnetic ring 125, for example made of a ferromagnetic material such as iron, nickel and the like. In further embodiments, the size of the docking member of the aerial vehicle is configured to be about the same size as the magnetic ring 125. The magnetic ring is exemplary only, and the magnetic element may be shaped in other forms desired by a person skilled in the art. In some embodiments, the docking station connecting element 120 is disposed at the center of the magnetic ring 125. In some embodiments, the magnetic ring 125 may comprise a plurality of magnetic elements configured to be attracted to a magnet of the aerial vehicle connection element. The magnet of the aerial vehicle connection element is configured to be attached to the magnetic ring 125 of the latching mechanism 115 when in close proximity thereto, and therefore, bring the docking station connecting element 120 in communication connection with the aerial vehicle connector. The aerial vehicle connector is configured to be connected to the docking station connecting element 120, for the purpose of charging the aerial vehicle and exchanging electrical signals with the aerial vehicle. The aerial vehicle connector is secured to a bottom section of the docking station.

In some embodiments, the latching system is further configured to guide the aerial vehicle to the docking station. In some embodiments, the guidance is made to bring the aerial vehicle connector to optimal connection with the docking station connecting element 120 after the aerial vehicle connecting elements touches the docking station connecting element 120. In some embodiments, the magnetic ring 125 of the latching mechanism 115 is an electromagnetic plate. In such cases, the magnetic ring 125 is configured to be activated upon connection with the aerial vehicle connecting element and to magnetically pull the magnetic ring of the aerial vehicle connecting element to a complete overlap with the magnetic ring 125. Activation of the magnetic ring 125 may be done by changing voltage in the aerial vehicle.

In some embodiments, (if the aerial vehicle connecting element is smaller than the docking station connecting element 120), the magnetic ring 125 comprises a plurality of sub rings extending from the outer rim of the magnetic ring 125 to the docking station connecting element 120, disposed in the center thereof. In such cases, each ring of the plurality of subrings is an electromagnet capable to be turned on separately. In such cases, the docking station 100 is configured to recognize to which rings of the plurality of rings the aerial vehicle connecting elements was connected. Then, the docking station 100 activates some of the plurality of the magnetic rings that are located between the docking station connecting element 120, to pull the aerial vehicle connecting elements towards the center of the docking station 100. Furthermore, the docking station 100 may turn off any one of the plurality of magnetic objects that do not contribute to the pulling towards the center.

In order to be released from the docking station 100, several measures may be employed. In some cases, the aerial vehicle may deactivate the magnetic connection by manipulating the docking member. Such deactivation may be implemented by moving the docking member away from the magnetic ring 125 of the docking station 100. In some other cases, the docking station 100 comprises a ferromagnetic member and the aerial vehicle comprises a magnetic member to which the ferromagnetic member is attracted. The aerial vehicle may change a voltage which changes the magnetic field created by the magnetic member, or create another magnetic field which cancels at least a portion of the magnetic field which attracts the ferromagnetic member of the docking station 100. In other embodiments, the aerial vehicle utilize its motors to push itself away from the docking station 100. In some cases, the aerial vehicle may use a physical pin-like object configured to maneuver an object or section of the aerial vehicle downwards, thus reducing or canceling the magnetic connection.

Figure 2A:
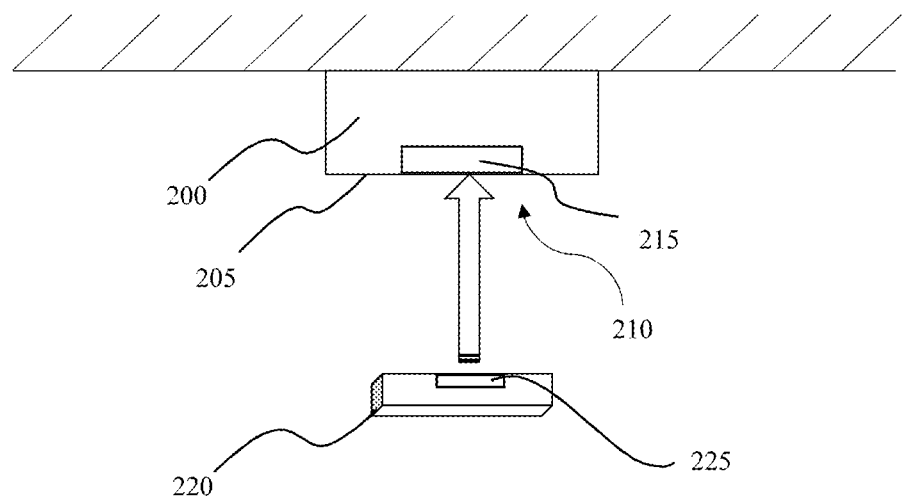
FIGS. 2A-2B disclose a docking station comprising a magnetic latching system, according to exemplary embodiments of the subject matter.
Figure 2B:
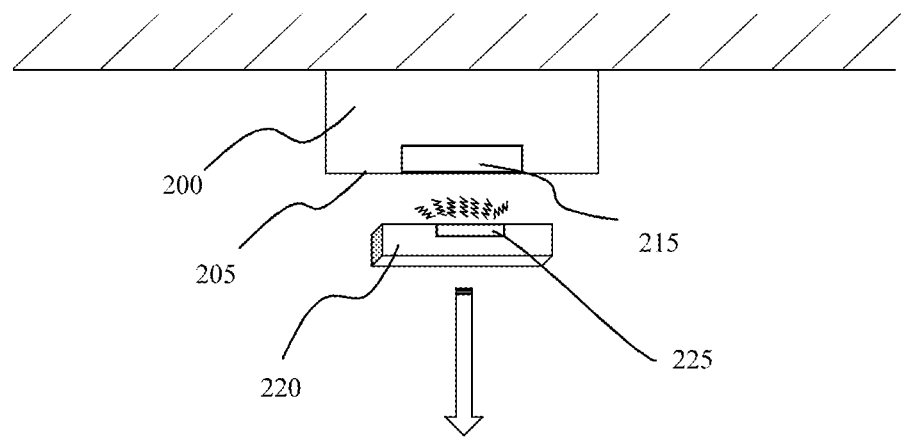

FIGS. 2A-2B disclose a docking station comprising a magnetic latching system, according to exemplary embodiments of the subject matter. In some embodiments, a docking station 200 comprising a bottom section 205 facing downwards. In some embodiments, the docking station 200 may be attached to a ceiling, as shown in FIG. 2A, a pole and the like. The docking station 200 comprises an interface configured to enable hanging the docking station above the ground, for example hang from the ceiling, an illumination module or secured to a wall. The interface may be located in the top section of the docking station, the section facing upwards. The top section may consume the topmost 10-90 percent of the docking station's height, as desired by a person skilled in the art. The interface may be adhesive material in the top section or side surface of the docking station. The interface may be any type of mechanism to which an object can be secured, such as a hook or loop.

In some embodiments, the latching mechanism 210 of the docking station 200 utilizes at least one magnetic component 215, configured to dock an aerial vehicle 220 comprising a metal plate 225 located on the upper side thereof, to the docking station 200. In some embodiments, the latching mechanism 210 may be shaped as a ring/circle and may be comprised of two or more magnetic elements.

When an aerial vehicle 220 hovers below the docking station 200 and upon ascending thereto, the latching mechanism 210 starts pulling the metal plate 225 of the aerial vehicle 220. Thus, the aerial vehicle 220 is pulled towards the latching mechanism 210 until the metal plate 225 thereof contacts the at least one magnetic component 215 of the latching system 210. In some embodiments, the at least one magnetic component 215 is configured to orient the docking of the aerial vehicle 220 such that the docking station connecting element 120 will contact the aerial vehicle connecting element, thus bringing the aerial vehicle to an optimal connection. In some embodiments, the docking station connecting element 120 is placed in the middle of the latching mechanism 210. In further embodiments, the at least one magnetic component 215 spans around the docking station connecting element 120. In some embodiments, the at least one magnetic component 215 are comprised of at least one electromagnet component.

The aerial vehicle may comprise one or more sensors, such as an image sensor, humidity sensor, temperature sensor, and the like. When required to capture images or videos in a specific location from a higher angle, the aerial vehicle saves much energy when hang to a docking station secured to a high place, such as the ceiling. Saving the energy enables the aerial vehicle to function more time without being charged. Therefore, the docking station may also charge the aerial vehicle, but the invention is not limited to charging docking stations, as the aerial vehicle saves energy simply by being secured to the docking station.

In order to be released from the docking station 200, several measures may be employed. In some cases, as shown in FIG. 2B, the aerial vehicle may activate the magnetic component 215, thus creating a magnetic force to negate the electrical pull of the latching mechanism 210. In other cases, the latching mechanism 210 may comprise an electromagnet. In such cases, the docking station 200 may deactivate the electromagnet to allow the aerial vehicle to pull off from the latching mechanism 210. Other embodiments may include providing a thrust using the rotors of the aerial vehicle to push the aerial vehicle away from the docking station.

Figure 3A:
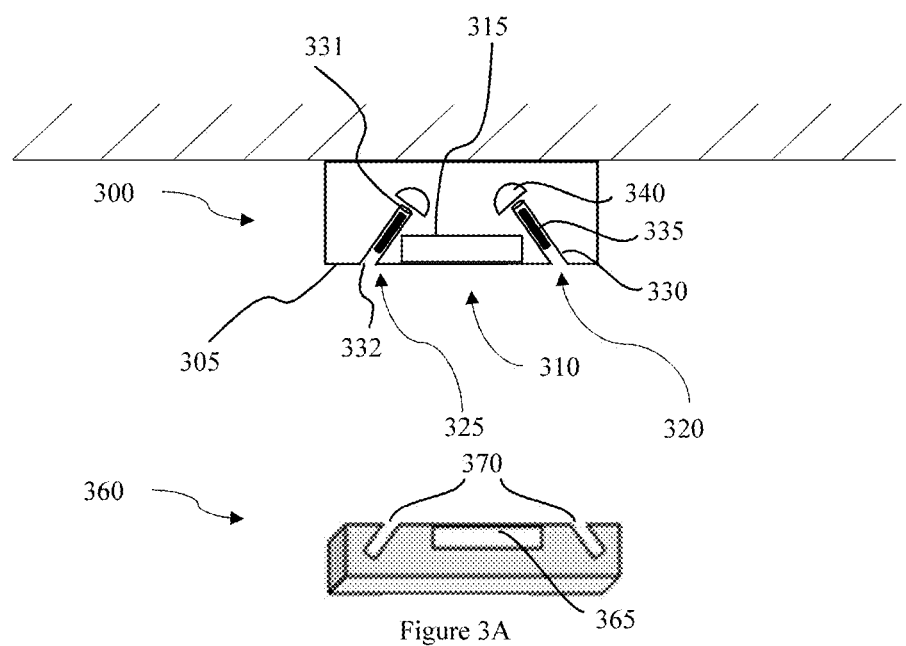
FIGS. 3A and 3B discloses a docking station comprising a semi-mechanical latching system, according to exemplary embodiments of the subject matter.
Figure 3B:
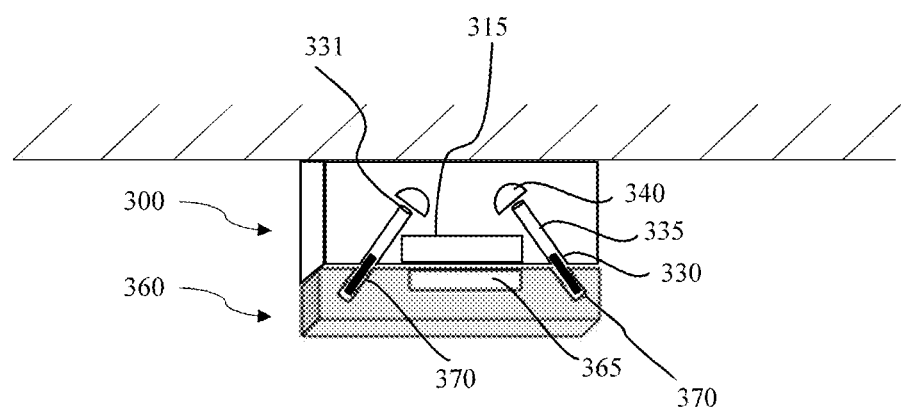

FIGS. 3A and 3B discloses a docking station comprising a semi-mechanical latching system, according to exemplary embodiments of the subject matter. FIG. 3A discloses a docking station 300 secured to a ceiling, with a connection surface 305 thereof facing downwards. In some embodiments, a semi-mechanical latching mechanism 310 is placed on the connection surface 305 of the docking station 300. The semi-mechanical latching mechanism 310 comprises at least one magnetic component 315 situated on the connection surface 305, and two or more locking units 320 and 325 situated on the connection surface 305 and sideways to the at least one magnetic component 315. In further embodiments, each pair of the two or more locking units 320 and 325 are situated along a single axis with the at least one magnetic compound 315 between each pair.

In some embodiments, each of the two or more locking units 320 and 325 comprises a hollow shaped tube 330. The hollow shaped tube 330 comprises an inner end 331 and an outer end 332, a bolt unit 335 and a securing portion 340 located at the inner end of the hollow shaped tube. In some embodiments, the hollow shaped tube 330 may be shaped as a straight tube, a bent-shaped tube and the like. Additionally, the hollow shaped tube is designed to be longer than the bolt unit 335, whereby the bolt unit 335 is completely engulfed within the hollow shaped tube 330 when adjacent to the inner end 331. In some embodiments, the inner walls of the hollow shaped tube 330 are designed to have a low friction coefficient as to allow objects to easily move/slide thereon by gravity from the inner end 331 to the outer end 332.

The bolt unit 335 is internally disposed inside the hollow shaped tube 330 and is made from a metallic compound which is attracted to magnets and/or a Ferromagnetic compound. Additionally, the bolt unit 335 is shaped in a similar manner, but smaller in size to the hollow shaped tube 330, for allowing free movement thereof inside the hollow shaped tube 330. In some embodiments, the bolt unit is attached from a side thereof to a sliding portion inside a track situated along the inner walls of the hollow shaped tube 330. In such cases, the track spans from the inner end 331 almost up to the outer end 332. Thus, the locking unit may not be separated from the hollow shaped tube 330, as further described below (in FIG. 4).

In some embodiments, the bolt unit 335 is configured to slide down the hollow shaped tube and to stick out/protrude out of the connection surface 110 of the docking station 100. In further embodiments, the bolt unit 335 is configured to enter a complementary hollow tube 350, located on the aerial vehicle 360. Thus, latching and guiding the aerial vehicle to the docking station 300.

The securing portion 340 is connected/adjacent to the inner end 331 of the hollow shaped tube 330. In some embodiment, the securing position is an electromagnet capable to magnetically attract the bolt unit 335 from a remote position and/or to maintain the bolt unit 335 adjacent thereto. The securing portion 340 is configured to have an active mode, in which the electromagnet is turned on and attracts the bolt unit 335. The securing portion 340 is further configured to have a dormant mode, in which the electromagnet is turned off and the locking bolt is free to slide down the hollow shaped tube 330 and into the complementary hollow tube 350.

In other embodiments, the securing portion may be a mechanical mechanism, configured to hold the bolt unit 335 at the inner end 331 of the hollow shaped tube 330. In such cases, the mechanical mechanism may have a protrusion knob extending from the connection surface 305 of the docking station 300. The protrusion knob is designed such that pressing thereon from below, for example by an aerial vehicle, releases the bolt unit 335. Additionally, the mechanical mechanism is configured to hold the bolt unit 335 when same is pushed towards the inner end, for example by an electromagnet of the aerial vehicle activating opposite magnetic force.

FIG. 3B discloses an aerial vehicle 360 latched to the docking station 300. The docking station 300 is configured to receive and latch an aerial vehicle 360 using the semi-mechanical latching mechanism 310. The aerial vehicle 360 comprises a metal plate 365 and two or more complementary hollow tubes 370 having an outer end 371 and an inner end 372. In some embodiments, the magnet is made of a magnetically attached metal. In some embodiments, the two or more complementary hollow tubes 370 is configured/shaped to match the hollow shaped tube 330, thus configured to receive the bolt unit 335 therein. In such cases, when the bolt unit 335 is placed at the outer end 371 of the two or more complementary hollow tubes 370, the aerial vehicle is latched to the docking station 300.

In order to be released from the docking station 300, several methods may be applied. In some embodiments, the aerial vehicle may send a signal to activate the securing portion 340, thus pulling up the bolt unit 335 and releasing the aerial vehicle from the semi-mechanical latching mechanism 310. In further embodiments, the metal plate 365 of the aerial vehicle may serve as an electromagnet. In such cases, the metal plate 365 may create an opposite magnetic force to push away the bolt unit 335 all the way to the inner end 331 of the hollow shaped tube 330, thus releasing the aerial vehicle 360.

FIGS. 4A-4D discloses hollow tubes with locking units disposed therein, according to exemplary embodiments of the subject matter. FIGS. 4A and 4B disclose an inclined tube 410 comprising an inner wall portion 411, an inner end 412 and an outer end 413. In some embodiments, a tube track 414 is situated in the inner wall portion and is spanning from the inner end 412 and almost to the outer end 413. A bolt unit 415 is disposed inside the inclined tube 410. In some embodiments, the bolt unit comprises a sliding portion 416 and a rail portion 417 connected thereto by a bolt arm 418. In some embodiments, the bolt arm is situated in the uppermost side portion of the bolt unit 415. The sliding portion of the bolt unit 415 is connected to the tube track 414. In such cases, upon releasing the bolt unit from its secured position at the inner end 412, the sliding portion 416 and the rail portion 417 of the bolt unit are configured to slide down the inner wall portion 411 until the rail portion 417 reaches the lower end of the track, before the outer end 413. When the rail portion is at the lower end of the track, the sliding portion of the bolt unit 415 is situated outside of the inclined tube 410, as disclosed in FIG. 4B.

FIGS. 4C and 4D disclose a circular hollow tube 420 comprising an inner wall portion 421, an inner end 422 and an outer end 423. In some embodiments, a tube track 424 is situated in the inner wall portion and is spanning from the inner end 422 and almost to the outer end 423. A bolt unit 425 is disposed inside the circular hollow tube 420. In some embodiments, the bolt unit comprises a sliding portion 426 and a rail portion 427 connected thereto by a bolt arm 428. In some embodiments, the bolt arm 428 is situated in the uppermost side portion of the bolt unit 425. The sliding portion 426 of the bolt unit 425 is connected to the tube track 424. In such cases, upon releasing the bolt unit 425 from a secured position at the inner end 422, the sliding portion 426 and the rail portion 427 of the bolt unit are configured to slide down the inner wall portion 421 until the rail portion 427 reaches the lower end of the track, just before the outer end 423. When the rail portion is at the lower end of the track, the sliding portion 426 of the bolt unit 415 is situated outside of the circular hollow tube 420, as disclosed in FIG. 4D.

Figure 5A:
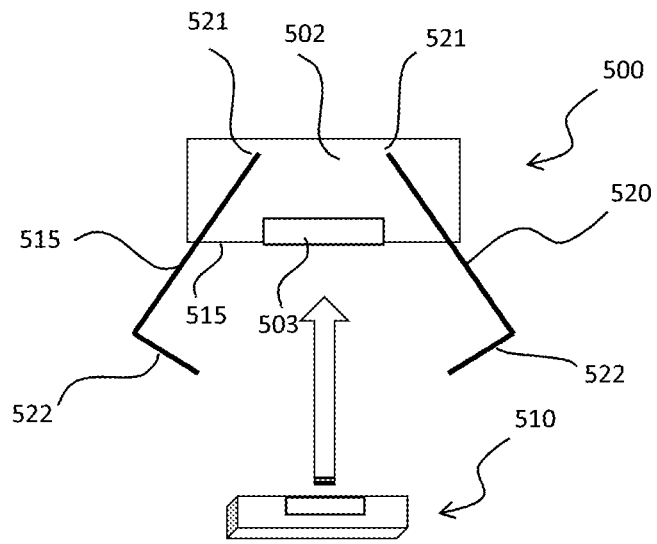
FIGS. 5A and 5B discloses a docking station comprising a mechanical latching system, according to exemplary embodiments of the subject matter.
Figure 5B:
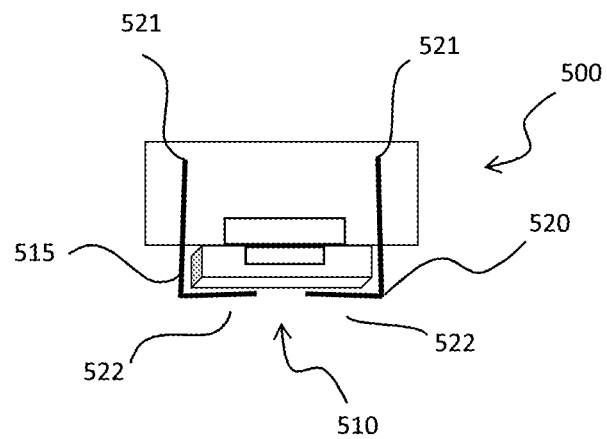

FIGS. 5A and 5B disclose a docking station comprising a mechanical latching system, according to exemplary embodiments of the subject matter. In some embodiments, a docking station 500 is placed on a ceiling. In such cases, the docking station 500 comprises a base station 502 comprising a connection surface 503 facing downward. In some embodiments, a mechanical latching mechanism 505 is implemented for latching an aerial vehicle 510. The mechanical latching mechanism 505 is configured to mechanically dock the aerial vehicle when the aerial vehicle is contacting the docking station. The mechanical latching mechanism 505 is further configured to guide the aerial vehicle 510 upon docking thereof. In some embodiments, the mechanical latching mechanism comprises at least two arms 515 and 520. The at least two arms 515 and 520 comprises a proximal end 521 and a distal end 522, where the at least two arms 515 and 520 are rotatably coupled around their proximal end 521 to the base station 502. The at least two arms 515 and 520 are designed to dock the aerial vehicle 510 and in further embodiments, to guide same to an optimal connection upon contact of the aerial vehicle 510 to the docking station 500.

In some embodiments, the distal end 522 of the at least two arms 515 and 520 is designed to hold/grasp at least a portion of the aerial vehicle 510. In some embodiments, as disclosed in FIG. 5B, each distal end 522 of the at least two arms 515 and 520 is further designed to be connected to another distal end 522 of the at least two arms 515 and 520, for creating a base for the aerial vehicle 510. In such cases, the base is designed to hold the aerial vehicle 510 when same turn off the engines thereof. Additionally, the created base is configured to prevent the aerial vehicle 510 from disconnecting from the docking station, and in further embodiments, to guide the aerial vehicle connecting element to the docking station connecting element 120 for optimal connection.

In other embodiments, the at least two arms 515 and 520 are configured to grasp at least a lateral portion of the aerial vehicle 510 or be secured inside designated tunnels inside the lateral portion of the aerial vehicle 510.

In some embodiments, the mechanical latching mechanism 505 comprises an actuating pedal 530. In some embodiments, the actuating pedal 530 may be embedded with the docking station connecting element 120. In other embodiments, the actuating pedal 530 may be a separate portion of the docking station 500 and be placed on the connection surface 503 adjacent to the docking station connecting element 120. In some embodiments, the actuating pedal 530 is configured to operate/rotate the at least two arms 515 and 520 upon pressing thereon. In some embodiments, the actuating pedal may operate mechanically by a spring mechanism, or electrically by sending an engine electric signal. In some embodiments, the actuating pedal 530 is configured to be pressed upon activating pressure thereon. In some embodiments, the pressure is derived from the lifting force of the aerial vehicle 510.

Figure 6C:
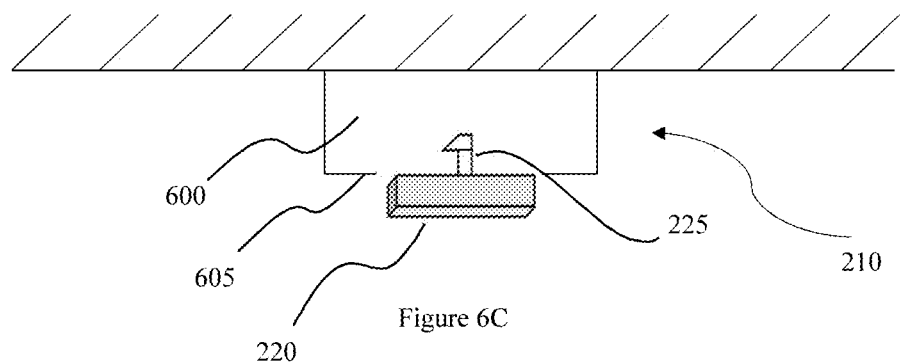

FIGS. 6A-6D disclose a docking station positioned comprising a magnetic latching system, according to exemplary embodiments of the subject matter. FIG. 6A discloses a docking station 600 comprising a connection surface 605 facing downwards and a top section 607 facing upwards, said top section 607 is configured to be attached or secured to a horizontal surface. In some cases, the horizontal surface to which the docking station 600 may be attached or secured may be a ceiling, a top surface of an arm or a horizontal platform, and the like. In some embodiments, the docking station 600 comprises a latching portion 610 configured to secure a magnetically-operated matching latching mechanism 630 of the aerial vehicle 625. The latching portion 610 secured the aerial vehicle 625 to the connection surface 605 of the docking station 600.

In further embodiments, the latching portion 610 comprises a bore 615, the bore's inlet is situated at the connection surface 605. The bore 615 extends from the connection surface 605 and inwards towards the docking station 600. The bore 615 comprises an open end 616 and a closed end 617. The bore 615 further comprises bore walls 618 extending throughout the periphery of the bore 615. The bore 615 may be of a polygonal or cylindrical shape, configured to accommodate an extension 635, included in the magnetically-operated matching latching mechanism 630 of the aerial vehicle 625. In FIGS. 6A-6D, the magnetically-operated matching latching mechanism 630 is located below the bore 615 or below the component in the docking station 600 that interacts with the magnetically-operated matching latching mechanism 630.

In some embodiments, a shelf 620 is defined on the bore walls 618. In some embodiments, the shelf 620 is created by a cavity 622, said cavity 622 may extend vertically outwards from the bore walls 618. In such cases, the shelf 622 is defined as a portion of the cavity. In some embodiments, the shelf 622 may be situated around the inner surface of the bore walls 618 and to extend inwards therefrom. In some embodiments, the shelf 620 extends about the closed end 617 of the bore 615. In other embodiments, the shelf 620 may extends about the open end 616 of the bore 615. In some cases, the shelf 620 extends up to the entire circumference of the bore walls 618 and may be shaped as a ring circumferencing the bore 615. In some embodiments, the shelf 622 may have an upper side, extending perpendicularly to the bore walls 618, and a bottom side, vertical to the bore walls 618. In some embodiments, the bottom side of the shelf 620 may be inclined with an angle to the bore walls 618 of up to 90° degrees. In some embodiments, the shelf 620 is in a trapezoid shape.

The latching portion 610 of the docking station 600 is configured to receive and secure at least a portion of the aerial vehicle 625. In some embodiments of the present invention, the matching latching mechanism 630 comprises an extension 635 having a top end 636. In some embodiments, the extension 635 may be shaped as a cylinder, wherein the cylinder comprises a cylinder wall 637 surrounding the cylinder. The extension 635 is configured to fit through at least a portion of the bore 615. In some cases, the matching latching mechanism 630 comprises a latcher 640 configured to be secured to the shelf 620. The latcher 640 may be laterally situated at the top end 636 of the extension 635. The latcher 640 is pivotally connected to the extension 635 by an axis located about the top end 636 thereof.

The latcher 640 is configured to move between two states: an open state and a closed state. In the open state, the latcher is situated laterally outwards from the cylinder wall 637. In the closed state, the latcher 640 is folded inside the extension 635. In some cases, when the latcher 640 is in the closed state, the latcher 640 is engulfed inside a slot (not shown) situated about the top end 636 of the extension 635. In such cases, the slot spans on a portion of a longitudinal axis extending vertically from the top end 636 of the extension 635 to the top portion of the aerial vehicle 625. In other embodiments, the slot is situated adjacent to an edge of the extension 635. In some cases, the latcher 640 may be dimensioned to fit inside the space inside the slot. In further cases, the latcher 640 may be shaped as a portion of the extension 635 such that when the latcher 640 is in a closed state, the latcher 640 may be flush with the cylinder wall 637.

In some embodiments, the latcher 640 is a magnetic lock which is configured to be held in an open state. In further embodiments, the latcher is configured to move to a closed state when a magnetic force is applied thereon from the aerial vehicle 625.

In some embodiments, the latcher 640 may comprise an upper surface, extending vertically from the cylinder wall 637 and a bottom surface extending perpendicularly from the cylinder wall 637. In some cases, the upper surface may have an inclination in an angle to the cylinder wall 637 of up to 90° degrees, forming the latcher 640 in a trapezoid shape. In further embodiments, the angle of the upper surface may complete the angle of the bottom side of the shelf 620 to 90° degrees.

As shown in FIG. 6B, when the aerial vehicle 625 hovers below the docking station 600 and upon ascending thereto, the matching locking mechanism 630 enters the bore 615 of the latching portion 610. When the latcher 640 contacts the bore walls 618, the latcher 640 pivots to the closed state and into the slot. When the latcher 640 is in the closed state, the extension 635 is enabled to enter the bore 615 up to the closed end 617 thereof.

As shown in FIG. 6C, when the slot comprising the latcher 640 in a closed state has reached the cavity 622, the latcher mechanism is configured to push the latcher 640 to the open state. In some embodiments, the cavity contains the latcher, and the shelf 620 defined by the cavity 622 prevents the latcher 640 and the aerial vehicle attached thereto from exiting the docking station 600. In some embodiments, the latcher 640 is sized to fit the entire surface of the shelf. In some embodiments, the aerial vehicle 625 may comprise several latchers identical to latcher 640, in different and parallel locations around the cylinder wall 637.

Figure 6D:
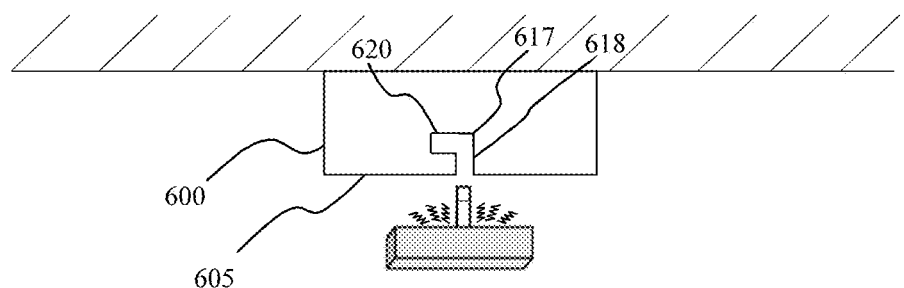

In order to be released from the docking station 600, as shown in FIG. 6D, the aerial vehicle 625 may apply a magnetic force on the docking station 600. The magnetic force may be applied, for example, by an electromagnet residing inside the aerial vehicle 625. In such cases, the magnetic holding mechanism holding the latcher 640 in the open state transfers the latcher 640 to the closed state inside the slot in response to the magnetic force applied thereon.

Figure 7A:
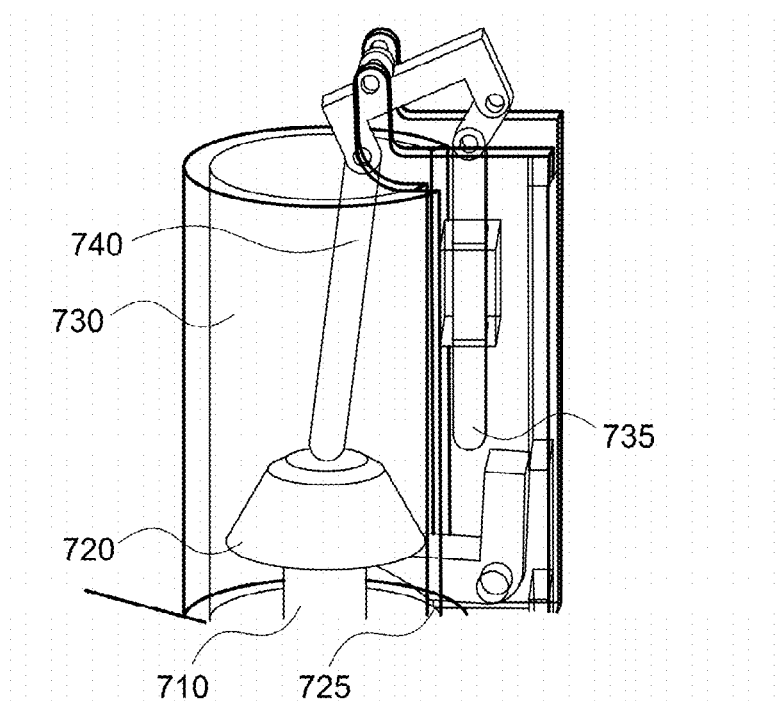
FIGS. 7A and 7B disclose a top section of the aerial vehicle secured by the latching mechanism and later released from the docking station, according to exemplary embodiments of the disclosed subject matter.
Figure 7B:
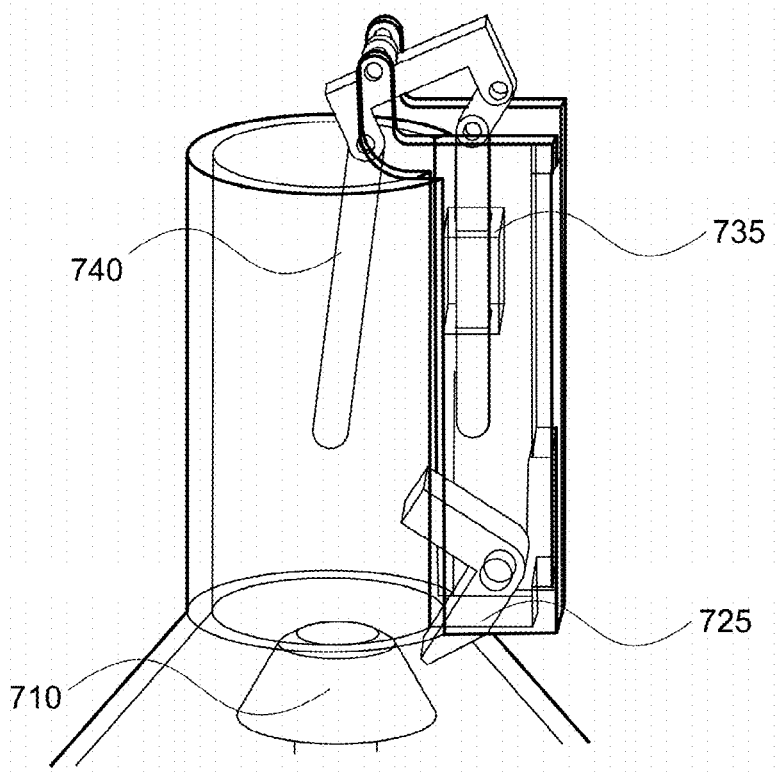

FIGS. 7A and 7B disclose a top section of the aerial vehicle secured by the latching mechanism and later released from the docking station, according to exemplary embodiments of the disclosed subject matter. In FIG. 7A, the aerial vehicle is secured to the docking station using a latching mechanism 725. The latching mechanism is located in a first position, in which the aerial vehicle is secured to the docking station. The first position is maintained using a pole 735 located in a downward position, when a ferromagnetic member 740 is attracted to a magnetic member 710 of the aerial vehicle. When the aerial vehicle is required to be released from the docking station, as shown in FIG. 7B, the latching mechanism moves to a second position, which enables release of the aerial vehicle. In some exemplary cases, movement of the latching mechanism 725 is enabled by reducing or canceling the magnetic attraction of the ferromagnetic member 740 to the magnetic member 710. In some other cases, the aerial vehicle may use its motor to apply more power downwards and thus move the latching mechanism 725.

Figure 8:
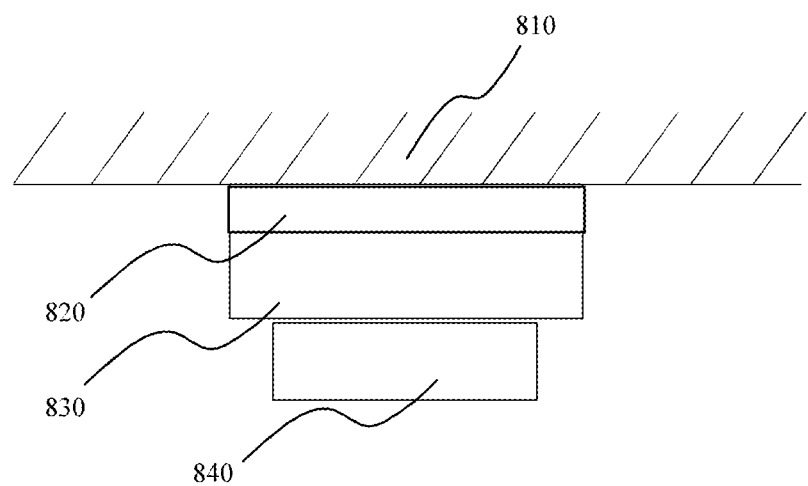
FIG. 8 shows a docking station and an aerial vehicle secured to the docking station secured to a ceiling, according to exemplary embodiments of the disclosed subject matter.

FIG. 8 shows a docking station and an aerial vehicle secured to the docking station secured to a ceiling, according to exemplary embodiments of the disclosed subject matter. The ceiling 810 represents a roof, a lateral surface such as a tabletop, and any other lateral surface having a volume underneath. The ceiling 810 may be made of wood, metal, concrete and the like. The ceiling 810 may be coated or otherwise covered. The docking station comprises a top section having an interface 820. The interface 820 may be a layer of material, such as adhesive material to be glued or attached to the ceiling. The interface 820 may comprise a mechanism such as screws secured to the ceiling 810. The bottom section 830 of the docking station comprises a latching mechanism configured to secure the aerial vehicle 840 to said docking station.

Figure 9:
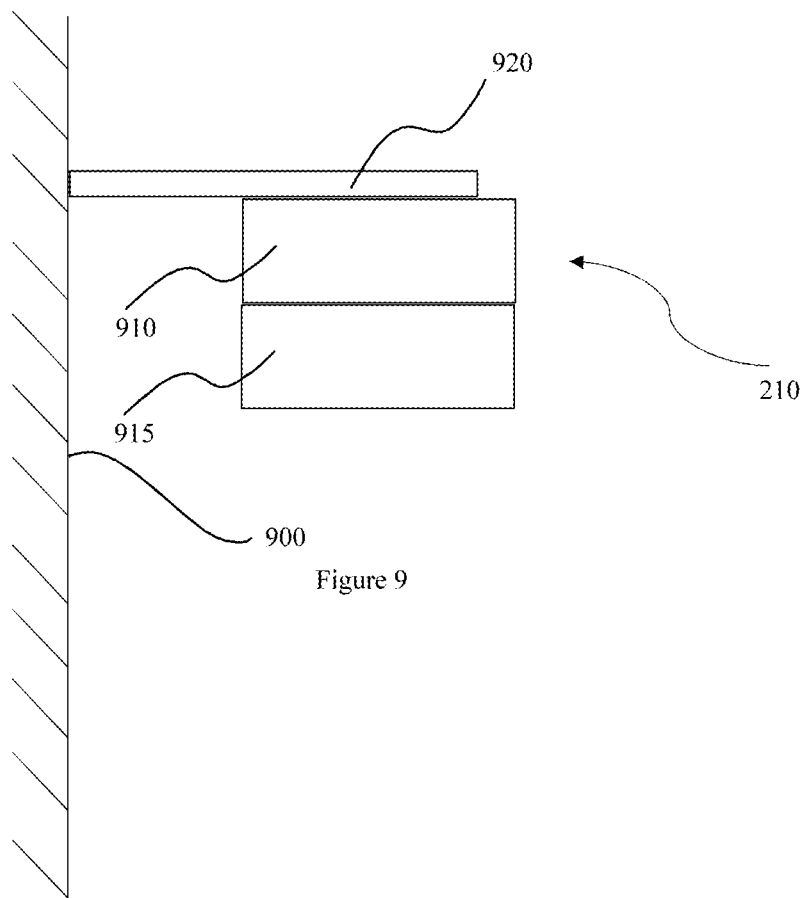
FIG. 9 shows a docking station and an aerial vehicle secured to the docking station secured to a wall, according to exemplary embodiments of the disclosed subject matter

FIG. 9 shows a docking station and an aerial vehicle secured to the docking station secured to a wall, according to exemplary embodiments of the disclosed subject matter. The wall 900 may be any vertical or sloped surface, such as walls of a physical structure, building, room, public structure and the like. An arm 920 extends from the wall 900, for example laterally or in an angle versus the wall's surface. The arm 920 functions as the interface between the wall 900 and the docking station 910. The aerial vehicle 915 is secured to the docking station 910 using a magnetic connection, as elaborated above.

Figure 10:
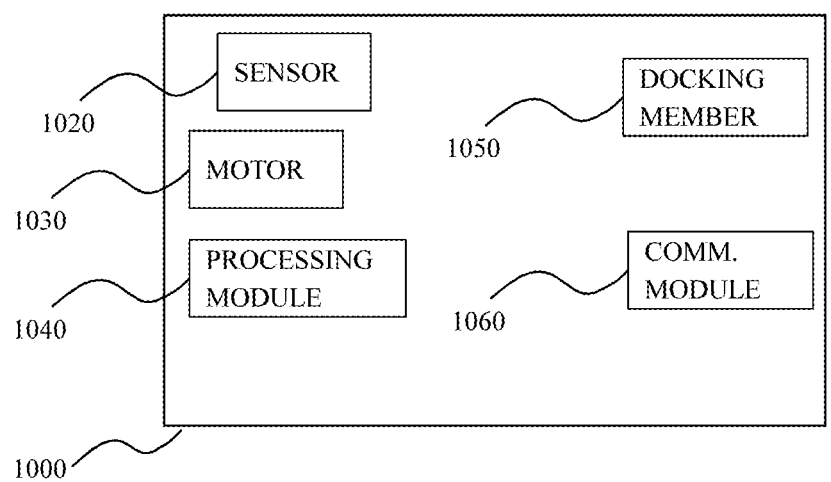
FIG. 10 shows a schematic structure of the aerial device components, according to exemplary embodiments of the subject matter.

FIG. 10 shows a schematic structure of the aerial device components, according to exemplary embodiments of the subject matter. The aerial vehicle 1000 comprises a motor 1030 configured to enable the aerial vehicle 1000 to move from one place to another. The motor 1030 receives power from a power source, such as a battery. The aerial vehicle 1000 also comprises a docking member 1050 configured to secure the aerial vehicle 1000 to a docking station using a magnetic connection formed between the docking member 1050 and a latching mechanism of the docking station. The aerial vehicle 1000 may comprise a processing module 1040 configured to control the process of docking into and releasing from the docking station. The processing module 1040 may function according to a set of rules stored in a memory module located in the aerial vehicle 1000 or accessible to the aerial vehicle 1000. The aerial vehicle 1000 may comprise a communication module 1060 configured to exchange electrical signals, either wirelessly or via a wired channel. The aerial vehicle 1000 may comprise a sensor module 1020 configured to collect information from the vicinity of the aerial vehicle 1000. The sensor module 1020 may comprise one or more sensors, such as noise sensor, image sensor, temperature sensor and the like.

It should be understood that the above description is merely exemplary and that there are various embodiments of the present invention that may be devised, mutatis mutandis, and that the features described in the above-described embodiments, and those not described herein, may be used separately or in any suitable combination; and the invention can be devised in accordance with embodiments not necessarily described above.

What is claimed is:

1. A system for securing an aerial vehicle to a lower portion of a docking station, comprising:
    a docking station, comprising:
    a top section located in an upper portion of the docking station, said top section comprises an interface configured to secure the docking station to a stationary element located above the ground; a bottom section located in a lower portion of the docking station;
    a docking station connecting element located in the lower portion of the docking station, said docking station connecting element is configured to charge the aerial vehicle;
    the system also comprises the aerial vehicle, comprising:
    a docking member, said docking member is configured to dock the aerial vehicle into the docking station and to release the aerial vehicle from the latching mechanism of the docking station;
    aerial vehicle connector located on a top section of the aerial vehicle configured to receive electrical power from the docking station connecting element;
    wherein the top section of the aerial vehicle is in physical contact with the bottom section of the docking station when the aerial vehicle is docked to the docking station;
    a latching mechanism located in the aerial vehicle or in the docking station, said latching mechanism is configured to secure said aerial vehicle to said docking station;
    wherein the latching mechanism is a magnetic latching mechanism comprising at least one magnetic component securing the aerial vehicle to the docking station by attracting a ferromagnetic member located in the system;
    a processing module configured to control the operation of the docking member.

2. The system of claim 1, wherein the at least one magnetic component is carried by the docking station and the ferromagnetic member is carried by the aerial vehicle.

3. The system of claim 1, wherein the at least one magnetic component is carried by the aerial vehicle and the ferromagnetic member is carried by the docking station.

4. The system of claim 1, wherein the processing module is configured to move the docking member between a first position in which the docking member is attracted to the magnetic latching mechanism to a second position in which the docking member is not attracted to the magnetic latching mechanism, when removing the aerial vehicle from the docking station.

5. The system of claim 4, wherein the aerial vehicle comprises a magnetic member controlled by the processing module, said magnetic member is configured to reject the magnetic field applied by the magnetic latching mechanism.

6. The system of claim 4, wherein the magnetic latching mechanism comprises a metal plate located on the lower portion of the docking station.

7. The system of claim 6, wherein the magnetic latching mechanism is located in the docking station connecting element.

8. The system of claim 6, wherein the magnetic latching mechanism comprises at least one electromagnetic component.

9. The system of claim 1, wherein the processing module is configured to activate the magnetic field created by the magnetic component.

10. The system of claim 1, wherein the magnetic latching mechanism comprises at least one electromagnetic component.

11. The system of claim 1, wherein the aerial vehicle comprises a magnetic member controlled by the processing module, said magnetic member is configured to reject the magnetic field applied by the magnetic latching mechanism.

12. The system of claim 1, wherein the magnetic component is located in the aerial vehicle, wherein the aerial vehicle is released from the docking station by activating the magnetic component, thus creating a magnetic force to negate the electrical pull of the magnetic latching mechanism.

13. The system of claim 1, wherein the magnetic latching mechanism comprises an electromagnet, wherein the aerial vehicle is released from the docking station by deactivating the electromagnet to allow the aerial vehicle to pull off from the magnetic latching mechanism.

* * * * *